US009779162B1

(12) United States Patent
Jackson et al.

(10) Patent No.: US 9,779,162 B1
(45) Date of Patent: Oct. 3, 2017

(54) INTERACTIVE CALENDAR WITH AN INTEGRATED JOURNAL

(71) Applicant: Google Inc., Mountain View, CA (US)

(72) Inventors: Dean Kenneth Jackson, Pittsburgh, PA (US); Daniel Victor Klein, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/835,556

(22) Filed: Aug. 25, 2015

Related U.S. Application Data

(63) Continuation of application No. 13/650,251, filed on Oct. 12, 2012, now Pat. No. 9,116,986.

(51) Int. Cl.
G06F 17/30 (2006.01)
G06Q 10/10 (2012.01)

(52) U.S. Cl.
CPC ... G06F 17/30731 (2013.01); G06Q 10/1095 (2013.01)

(58) Field of Classification Search
CPC ......... G06F 17/30731; G06F 17/30702; G06F 17/3022
USPC ........................................................ 707/736
See application file for complete search history.

(56) References Cited

U.S. PATENT DOCUMENTS

| 2002/0161756 | A1* | 10/2002 | Fesq ..................... G06Q 10/10 |
| 2003/0144936 | A1 | 7/2003 | Sloan et al. |
| 2009/0319347 | A1 | 12/2009 | Albrecht |
| 2011/0178969 | A1 | 7/2011 | Falchuk et al. |
| 2012/0084372 | A1 | 4/2012 | Cohen |
| 2013/0036117 | A1* | 2/2013 | Fisher ............... G06F 17/30041 707/736 |
| 2013/0297551 | A1 | 11/2013 | Smith et al. |
| 2014/0047004 | A1 | 2/2014 | Anglin et al. |
| 2014/0047316 | A1* | 2/2014 | Strydom ............... G06F 3/0481 715/233 |

* cited by examiner

*Primary Examiner* — Thu-Nguyet Le
(74) *Attorney, Agent, or Firm* — Patent Law Works LLP

(57) ABSTRACT

A system and method for integrating a journal associated with a user into a calendar is disclosed. The journal application includes a calendar module, a metadata module, a user preference engine, an action engine, a suggestion engine and a user interface engine. The calendar module receives one or more goals set by the user and creates one or more events in the calendar. The metadata module aggregates one or more types of metadata associated with the user and the one or more events. The user preference engine associates a sharing level with the one or more types of metadata. The action engine executes one or more actions based on the one or more types of metadata. The suggestion engine determines an effect of the one or more actions on the one or more goals set by the user and provides one or more suggestions to the user.

20 Claims, 9 Drawing Sheets

INTERACTIVE CALENDAR WITH AN INTEGRATED JOURNAL

CROSS REFERENCE TO RELATED APPLICATIONS

This application is a continuation of and claims priority to U.S. application Ser. No. 13/650,251, filed Oct. 12, 2012, titled "Interactive Calendar with an Integrated Journal," which is incorporated by reference in its entirety.

BACKGROUND

The disclosure relates to integrating a journal associated with a user into a calendar.

Users of calendar applications frequently use the calendars to schedule events. As a result, various techniques have been developed to make the calendar more interactive for the user to schedule events. Existing calendar applications, however, manage the events as predictive events that will occur in the future and only include a time, a location and a list of invitees for the predictive events. In addition, the calendar applications are only about the event itself and fail to record the users' thoughts, feelings and aspirations related to the scheduled events and that of life in general. Furthermore, the calendar applications fail to collect the data relating to the users' thoughts, feelings and aspirations in a reportable manner and analyze the data further to generate a report on the data for the users.

SUMMARY

According to one innovative aspect of the subject matter described in this disclosure, a calendar module receives a request from a user to create one or more events and creates the one or more events; a metadata module receives feedback relating to one or more types of metadata associated with the user and the one or more events and aggregates the one or more types of metadata associated with the user and the one or more events; and an action engine executes one or more actions based on the one or more types of metadata; a suggestion engine determines an effect of the one or more actions on one or more goals associated with the user and provides one or more suggestions to the user responsive to determining the effect on the one or more goals.

In general, another innovative aspect of the subject matter described in this disclosure may be embodied in methods that include receiving a request from a user to create one or more events; creating the one or more events; receiving feedback relating to one or more types of metadata associated with the user and the one or more events and aggregating one or more types of metadata associated with the user and the one or more events; executing one or more actions based on the one or more types of metadata determining an effect of the one or more actions on the one or more goals associated with the user; and providing one or more suggestions to the user responsive to determining the effect on the one or more goals. Other aspects include corresponding methods, systems, apparatus, and computer program products.

These and other implementations may each optionally include one or more of the following features. For instance, the operations further include receiving a selection of the one or more types of metadata from the user and retrieving the one or more types of metadata selected by the user. The operations further include receiving the one or more goals set by the user.

For instance, the features further include the one or more types of metadata associated with the one or more events and the user being from a website server, the one or more types of metadata comprising a productivity level, the one or more types of metadata comprising a user location history, the one or more goals set by user comprising maximizing work productivity, the one or more actions comprising changing a setting on one or more devices associated with the user and the one or more suggestions comprising adjusting a purchase quantity of one or more items that have an effect on the one or more goals.

The specification describes a journal application that advantageously works with integrating a journal associated with the user into the calendar application. The journal application receives feedback on the custom metadata tags associated with the user and the one or more events. Lastly, because the journal application first measures the effect of the one or more actions on the goals set by the user, the journal application avoids generating suggestions that fail to address the user's set goals adequately.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

A system and method for integrating a journal associated with a user into a calendar application is described below.

Figure 1:
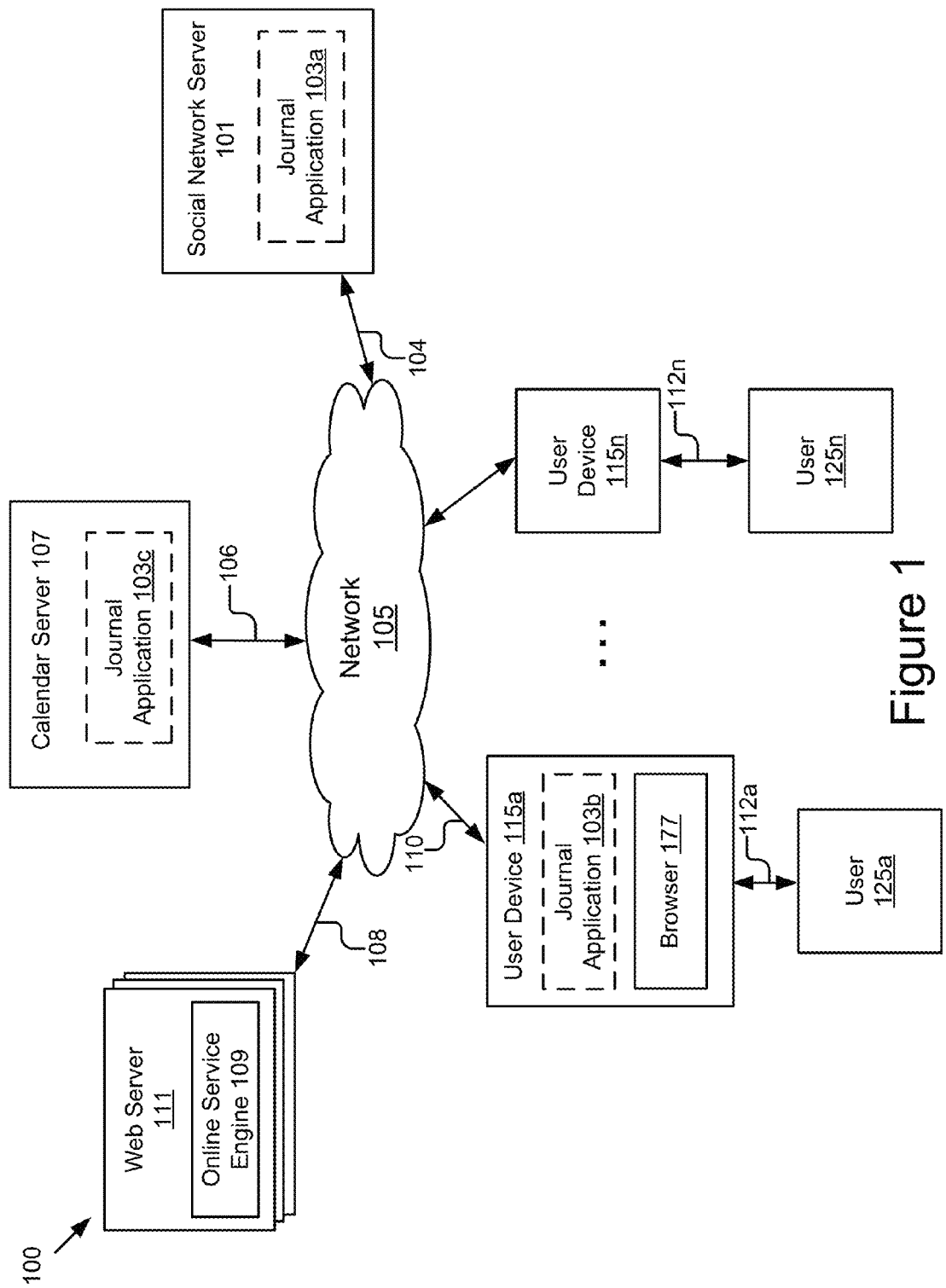
FIG. 1 is a block diagram illustrating an example system for integrating a journal associated with a user into a calendar.

FIG. 1 illustrates a block diagram of a system 100 for integrating a journal associated with a user in a calendar application. The illustrated description of the system 100 includes user devices 115*a* . . . 115*n* that are accessed by users 125*a* . . . 125*n*, a social network server 101 and a calendar server 107. In the illustrated implementation, these entities of the system 100 are communicatively coupled via a network 105. In FIG. 1 and the remaining figures, a letter after a reference number, for example "115*a*," is a reference to the element having that particular reference number. A reference number in the text without a following letter, for example "115," is a general reference to any or all instances of the element bearing that reference number.

The network 105 may be a conventional type network, wired or wireless, and may have any number of configurations, for example, a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In some instances, the network 105 may be a peer-to-peer network. The network 105 may also be coupled to or includes portions of a telecommunications network for sending data in a variety of different communication protocols. In some other instances, the network 105 includes Bluetooth communication networks or a cellular communications network for sending and receiving data, for example, via SMS/MMS, hypertext transfer protocol (HTTP), direct data connection, WAP, e-mail, etc. While only one network 105 is illustrated, any number of networks may be coupled to the above mentioned entities.

In some instances, a journal application 103a may be operable on the social network server 101, which is coupled to the network 105 via signal line 104. The social network server 101 can be a hardware server or servers that include a processor, a memory and network communication capabilities. The social network server 101 also includes a social network application (not pictured) that can be part of the journal application 103 or a standalone application. The social network server 101 sends and receives data to and from one or more of the user devices 115a, 115n, the calendar server 107 and the web servers 111 via the network 105. The social network application generates a social graph that maps the relationships between users in the social network including explicitly defined relationships and relationships implied by social connections with other online users. In some instances, the social graph can reflect a mapping of these users and how they are related. Furthermore, it should be understood that the social network server 101 may be representative of one social network and that there may be multiple social networks coupled to the network 105, each having its own server, application and social graph. For example, a first social network may be more directed to business networking, a second may be more directed to or centered on academics, a third may be more directed to local business, a fourth is directed to dating and others are of general interest or a specific focus. In some other instances, the social network data may be distributed across multiple social network servers 101 that, taken together, form a social network server farm.

The social network application manages the social network by handling account registration, publication of content (e.g., posts, comments, photos, links, check-ins, etc.), managing of groups, managing different sharing and visibility levels, updating the social graph, etc. For example, the social network application registers the user 125 by receiving information such as a username and password and generates a user profile that is associated with the user 125. In some instances, the user profile includes additional information about the user 125 including interests (e.g., soccer, reading, food), activities (e.g., search history, indications of acknowledgement, shared posts, unique posts, comments) and demographics (e.g., age, ethnicity, location). In some instances, the social network application requests that the user provide the email address that the user has associated with the calendar application in the calendar server 107 so that the users can be properly identified in the social network as being associated with invitee lists generated by the calendar application.

The social network server 101 sends and receives data to and from one or more of the user devices 115a, 115n, the calendar server 107 and the web servers 111 via the network 105. In some instances, the social network application receives social network content from the journal application 103. The social network content includes, for example, a description of activities performed by the user 125 and the user's friends, conversations, events, etc.

The user devices 115a, 115n in FIG. 1 are used by way of example. Although only two user devices 115 are illustrated, any numbers of user devices 115 are available to any number of users 125. The users 125a, 125n interact with the client devices 115a, 115n via signal lines 112a, 112n respectively. In some instances, the journal application 103b may be stored on the user device 115a which is connected to the network 105 via signal line 110. The journal application 103b can be a thin-client application that includes part of the journal application 103 on the user device 115a and part of the journal application 103 on the calendar server 107 or the social network server 101 to provide one or more suggestions to the user based on metadata associated with the user 125 and one or more events. The user devices 115 can be any computing device that includes a memory and a processor. For example, the user devices 115 can be a laptop computer, a desktop computer, a tablet computer, a mobile telephone, a personal digital assistant, a mobile email device, a portable game player, a portable music player, a television with one or more processors embedded therein or coupled thereto, or any other electronic device capable of accessing the network 105, etc.

In some instances, the user device 115a includes a browser 177. The browser 177 can be code and routines stored in the memory and executed by the processor of the user device 115. The browser 177 includes any browser application that can retrieve pages hosted by a server (for example, the calendar server 107, the social network server 101, a third-party server (not shown), etc.) and can present the pages on a display (not shown) on the user device 115a. In some other instances, the browser 177 retrieves and presents pages hosted by the user device 115. The term page includes any document or information resource that comprises textual elements, non-textual elements (for example, static images, animated images, audio, video, etc.), interactive elements (for example, games, buttons, hyperlinks, etc.), scripts (for example, JavaScript, code implementing Ajax techniques, etc.), metadata, etc. In some instances, the page is a web page in any file format (for example, HTML, HTML5, XHTML, XML, etc.).

In some instances, the journal application 103c may be operable on the calendar server 107, which is coupled to the network 105 via signal line 106. The calendar server 107 can be any computing device such as a hardware server including a processor, a memory and network communication capabilities. The calendar server 107 also includes a calendar application (not shown) that can be part of the journal application 103 or a standalone application.

In some instances, the calendar application requests that the user provide the email address that the user has associated with the social network application in the social network server 101. In some instances, the calendar server 107 provides one or more calendars (for example, billing calendars, holiday calendars, etc.) and maintains calendar data (for example, events, invitees, alerts, etc.) associated with one or more users of the multiple calendars in a storage device (not shown). In some other instances, the calendar server 107 verifies that users requesting access to calendar data stored in the storage device (not shown) are authorized to access the data they are requesting. For example, user authentication by username and password. Once a user is authenticated, the user can access his or her calendar data and/or share the calendar data with other users. Although the calendar server 107 is illustrated as a single server, it should be understood that the calendar server 107 may be representative of one calendar server and that there may be multiple calendar servers 107 coupled to the network 105, each having its own server, calendar application and calendar data. In some other instances, the calendar data may be distributed across multiple calendar servers 107 that, taken together, form a calendar data warehouse system.

The web server 111 can be any computing device such as a hardware server including a processor, a memory and network communication capabilities. The web server 111 is communicatively coupled to the network 105 via signal line 108. The web server 111 includes instructions and/or data for generating online services and providing one or more service updates from the online services to a user who has a subscription with the online services. For example, the web server 111 transmits weather service updates of an online weather service to a calendar application launched on a user device 115 via the network 105, causing the calendar application to associate the weather service update as a metadata with one or more events created by the user. Other examples of a web server 111 include a website for users to provide reviews and commercial websites for purchasing products. In some instances, the calendar server 107 and the web server 111 can be the same server or are at least controlled by the same entity.

The web server 111 comprises an online service engine 109 that can be code and routines that, when executed by a processor (not pictured), generates an online service that is hosted by the web server 111. The online service engine 109 can be stored on a non-transitory memory device associated with the web server 111. For example, the online service engine 109 includes a web mapping service that provides a current location of a user device 115. In some instances, the online service engine 109 provides the current location to the calendar application launched on the user device 115 in response to receiving an application programming interface (API) call. In some other instances, the online services that provide access to content include current news, financial news, image sharing service, search service, video sharing service, maps, price aggregator service, weather service, airline reservations, file archives, electronic mail, blogs, social networks, calendars, geolocation service, etc.

In some instances, the browser 117 accesses the online service using hypertext transfer protocol (HTTP) requests and retrieves content for one or more web pages generated from the online service engine 109.

The journal application 103 can be code and routines for integrating a journal associated with a user and providing one or more suggestions to the user in the calendar. In some instances, the journal application 103 receives one or more goals set by the user and, optionally, actions to meet the goals. The journal application 103 receives a request from a user to create one or more events and creates the one or more events. The journal application 103 aggregates one or more types of metadata associated with the one or more events and the user. The journal application 103 associates a sharing level to the one or more types of metadata. The journal application 103 executes one or more actions based on the one or more types of metadata. The effect of the one or more actions on the one or more goals associated with the user is determined. The journal application 103 provides one or more suggestions to the user responsive to determining the effect on the one or more goals. The journal application 103 is described in further detail below with reference to FIG. 2.

Figure 2:
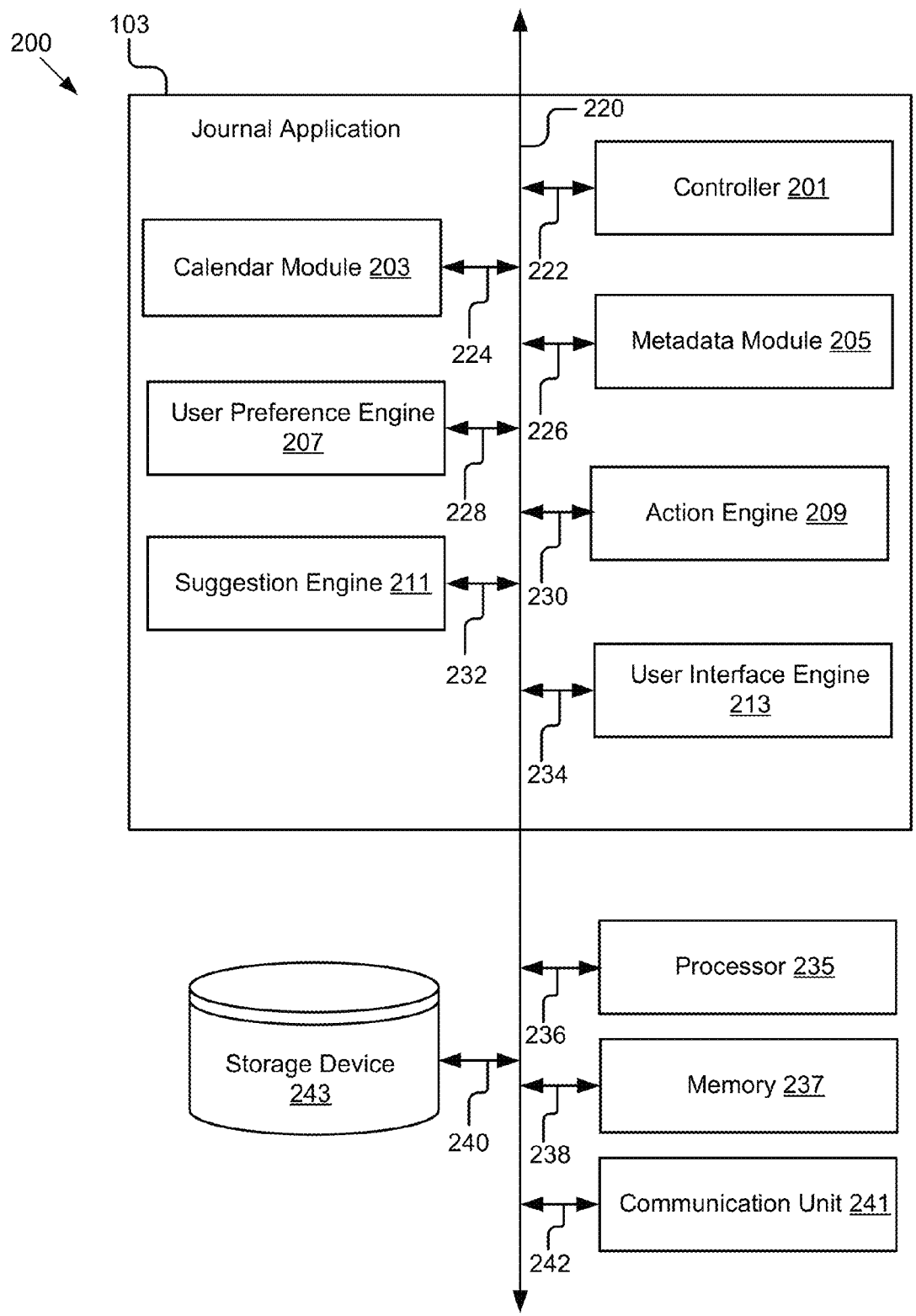
FIG. 2 is a block diagram illustrating an example journal application.

Referring now to FIG. 2, an example of the journal application 103 is shown in more detail. FIG. 2 is a block diagram of a computing device 200 that includes a processor 235, a memory 237, a communication unit 241, and a storage device 243 according to some implementations. The components of the computing device 200 are communicatively coupled by a bus 220. Optionally, the computing device 200 can be a social network server 101. In some instances, the computing device 200 may be a calendar server 107. In some other instances, the computing device 200 may be a user device 115a.

The processor 235 includes an arithmetic logic unit, a microprocessor, a general-purpose controller or some other processor array to perform computations and provide electronic display signals to a display device. The processor 235 is coupled to the bus 220 via signal line 236 for communication with the other components. Processor 235 may process data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. Other processors, operating systems, sensors, displays and physical configurations are possible.

The memory 237 stores instructions and/or data that may be executed by processor 235. The memory 237 is coupled to the bus 220 via signal line 238 for communication with the other components. The instructions and/or data may include code for performing any and/or all of the techniques described herein. The memory 237 may be a dynamic random access memory (DRAM) device, a static random access memory (SRAM) device, flash memory, or some other memory device known in the art. In some instances, the memory 237 also includes a non-volatile memory or similar permanent storage device and media for example a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 241 transmits and receives data to and from at least one of the user device 115, the calendar server 107, the social network server 101 and web servers 111 depending upon where the journal application 103 is stored. The communication unit 241 is coupled to the bus 220 via signal line 242. In some instances, the communication unit 241 includes a port for direct physical connection to the network 105 or to another communication channel. For example, the communication unit 241 includes a USB, SD, RJ-45 or similar port for wired communication with the user device 115. In some other instances, the communication unit 241 includes a wireless transceiver for exchanging data with the user device 115 or any other communication channel using one or more wireless communication methods, such as IEEE 802.11, IEEE 802.16, BLUETOOTH® or another suitable wireless communication method.

In some instances, the communication unit 241 includes a cellular communications transceiver for sending and receiving data over a cellular communications network such as via short messaging service (SMS), multimedia messaging service (MMS), hypertext transfer protocol (HTTP), direct data connection, WAP, e-mail, or another suitable type of electronic communication. In some other instances, the communication unit 241 includes a wired port and a wireless transceiver. The communication unit 241 also provides other conventional connections to the network for distribution of files and/or media objects using standard network protocols such as TCP/IP, HTTP, HTTPS, and SMTP as will be understood to those skilled in the art.

The storage device 243 can be a non-transitory memory that stores data used by the journal application 103. In some instances the data is stored temporarily, for example, a cache. The storage device 243 may be a dynamic random access memory (DRAM) device, a static random access memory (SRAM) device, flash memory, or some other memory device known in the art. In some instances, the storage device 243 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. In the illustrated implementation, the storage device 243 is communicatively coupled by the bus 220 for communication with the other components of the computing device 200 via signal line 240. Although only one storage device is shown in FIG. 2, multiple storage devices may be included. In some other instances, the storage device 243 may not be included in the computing device 200 and can be communicatively coupled to the computing device 200 via the network 105.

In some instances, the data stored in the storage device 243 includes calendar data, event metadata and user metadata. The calendar module 203 maintains the calendar data in the storage device 243 for one or more users of the calendar server 107 in some implementations. The calendar data can be a repository storing a description of one or more calendars (for example, a personal electronic calendar, a Chinese holidays calendar, a monthly bill payment calendar, etc.), one or more events created on the one or more calendars (for example, a business meeting, a birthday party, a recurring yoga class, etc.), event information (for example, a title, a start time, an end time, a start date, an end date, a number of attendees, reminders, event time zone, etc.), settings (for example, a user's time zone, etc.), one or more access control lists and one or more goals set by the user (for example, short term goals and long term goals). The event metadata may be a list (or a database) of metadata associated with the events created by the user. In some instances, the event metadata can be custom metadata manually reported by the user after the event has ended. For example, the user reports on how productive a business meeting was on a numeric scale (1 to 10), provides a binary response (yes or no) to whether a laboratory experiment executed promptly on schedule, provides a state of mind (excited, satisfied or disappointed) during a musical concert, enters exercise routines that were completed in a gym session (push-ups×40, pull-ups×10, cycling 5 miles, etc.), or adds food eaten at a dinner event with friends (whole sandwich, ravioli, sushi, etc.). In some other instances, the event metadata can be information that is automatically processed by the metadata module 205 from the one or more calendars in the calendar server 107. For example, a total number of hours the user spent attending business meetings in a week, a total number of hours the user spent working on a project, etc. The user metadata may be a list (or a database) of metadata associated with the user creating the one or more events. In some instances, the user metadata can be information that is automatically processed by the metadata module 205 from the webservers 111. For example, productivity at work on a numeric scale (1-10), weather at the user's location (rainy, cloudy, humid, wind speed, temperature, etc.), number of miles travelled by the user per day, number of hours the user spent at home, number of hours the user spent at work, number of hours the user spent online, the user's location during the day (e.g., using GPS data), check-ins to different locations, etc.

In some instances, the journal application 103 includes a controller 201, a calendar module 203, a metadata module 205, a user preference engine 207, an action engine 209, a suggestion engine 211, and a user interface engine 213.

The controller 201 can be code and routines for receiving data via the communication unit 241, routing the data to the appropriate engine or module and transmitting responses from modules or engines to the communication unit 241 for transmission to the user device 115, the social network server 101, the calendar server 107, or the web servers 111. In some instances, the controller 201 can be a set of instructions executable by the processor 235 to provide the functionality described below for managing data. In some other instances, the controller 201 can be stored in the memory 237 of the computing device 200 and can be accessible and executable by the processor 235. In either of the instances, the controller 201 may be adapted for cooperation and communication with the processor 235 and other components of the computing device 200 via signal line 222.

In some instances, the controller 201 identifies the type of data being received and transmits the data to the appropriate module or engine of the journal application 103. For example, the controller 201 receives information from the calendar server 107 for rendering a user interface of the calendar application and transmits the information to the user interface engine 213. In some other instances, the controller 201 receives user inputs and user actions submitted by the user 125 from the user device 115. The controller 201 sends the user actions and the user inputs to the appropriate module or engine of the journal application 103. For example, the controller 201 receives a request to create one or more events on a calendar from a user and forwards the request to the calendar module 203.

In some instances, the controller 201 receives information from other components of the journal application 103 and transmits the information to the appropriate component in the system 100 via the communication unit 241. For example, the controller 201 receives graphical data for generating a user interface from the user interface engine 213. The controller 201 transmits the graphical data to a display device (not shown) that is part of the user device 115.

In some instances, the controller 201 receives data from components of the journal application 103 and stores the data in the storage device 243. For example, the controller 201 receives data including calendar data determined by the calendar module 203 and stores the data in the storage device 243. In some other instances, the controller 201 retrieves data from the storage device 243 and sends the data to components of the journal application 103. For example, the controller 201 retrieves data including event metadata from the storage device 243 and sends the data to the action engine 209.

The calendar module 203 can be code and routines for creating one or more events on one or more calendars associated with a user. In some instances, the calendar module 203 can be a set of instructions executable by the processor 235 to provide the functionality described below for managing one or more calendars associated with the user. In some other instances, the calendar module 203 can be stored in the memory 237 of the computing device 200 and can be accessible and executable by the processor 235. In either of the instances, the calendar module 203 can be adapted for cooperation and communication with the processor 235, the controller 201, the user interface engine 213 and other components of the journal application 103.

The one or more calendars are provided by the calendar server 107. In some instances, the calendar module 203 processes one or more requests from the user to view, add and drop an event on one or more dates in the one or more calendars. The calendar module 203 sends instructions to the calendar server 107 to execute the one or more requests from the user. The event can be an event that takes place between two specific points in time. For example, the user can create an event for a business meeting with colleagues from 12 PM to 1 PM on a Tuesday. The event can be an event that repeats at a set interval. For example, the user can create a recurring event to attend yoga classes at 6 PM on Thursdays. The event can be an event that lasts for one or more days. For example, the user can create an event for a summer camping trip for three days with his or her family.

The event can be public or private. Public events have unrestricted visibility and are viewable by anyone or at least all users with access to the first user's calendar application. The private event is visible to a selected number of people that have permission to view the event. For example, a first user provides one or more second users with permission to view the event during creation of the event on his or her calendar. The first user can provide access to the one or more second users by using at least one of a name (e.g., full name, nickname, etc.), an email identifier and a social network profile identifier (e.g., a handle on the social network) of the one or more second users.

In some instances where the journal application 103 is stored on the social network server 101, the calendar module 203 processes a request from the user to generate an event for users on the social network, for example, users that are associated with a group in the social network. For example, if a user wants to have a get-together with a family group to make an announcement to family members, the user can specify in the calendar to invite members of the family group. The social network application (not shown) which can be a part of the social network server 101 provides the calendar module 203 with contact information for the members of the group (for example, names, email addresses, unique identifiers, etc.).

In some instances, the calendar module 203 receives one or more goals set by the user. The goals can be short term goals or long term goals. The goals are then integrated into the one or more calendars by the calendar module 203. For example, the user can set a short term goal to reduce commuting time on weekdays, to minimize number of hours spent online, to work out a set number of hours in the next month, etc. In another example, the user can set a long term goal to maximize happiness, to maximize quality time spent practicing a hobby, to maximize productivity at work in the following year, to lose weight, to exercise more, to be on time for work more often, etc. The calendar module 203 stores the calendar data including the created events and the set goals in the storage device 243.

The metadata module 205 can be code and routines for aggregating metadata associated with the one or more events and the user. In some instances, the metadata module 205 can be a set of instructions executable by the processor 235 to provide the functionality described below for aggregating and managing the metadata. In some other instances, the metadata module 205 can be stored in the memory 237 of the computing device 200 and can be accessible and executable by the processor 235. In either of the instances, the metadata module 205 can be adapted for cooperation and communication with the processor 235, the calendar module 203, the action engine 209 and other components of the journal application 103.

In some instances, the metadata module 205 receives requests from the user to associate one or more custom event metadata tags with an event created in the calendar. The metadata module 205 sends instructions to the calendar server 107 to incorporate the metadata tags into the calendar. The one or more custom event metadata tags are descriptive of one or more aspects of the event. For example, the user associates a "productivity level" metadata tag to a business meeting event, a "mood" metadata tag to a theatrical play event, an "exercise routine" metadata tag to a gym session event, a "diet" metadata tag to a dinner event, etc. In some instances, the one or more custom event metadata tags can be journal metadata. The journal metadata can be descriptive of one or more aspects of a day (or a calendar date) in the user's life on which the one or more events may be scheduled. For example, the user in general may integrate a journal into the calendar by associating a "my productivity today" metadata tag, an "on time for work?" metadata tag, a "my mood today" metadata tag, etc. to each day of his or her life.

The metadata module 205 instructs the user interface engine 213 to generate graphical data for displaying a notification message responsive to the scheduled event coming to an end and sends the notification message to the user to indicate that the event has ended. The notification message includes a reminder for the user to provide a custom feedback (or report) on the one or more custom event metadata tags associated with the event. For example, the notification message can be a notification in the social network's notification box or a pop-up message in the calendar with a reminder next to the date on which the event was scheduled. In some instances, the metadata module 205 generates the notification message within a few minutes of the scheduled event coming to an end. In some other instances, the metadata module 205 generates the notification message at the end of the day on which the scheduled event took place.

The metadata module 205 receives feedback on the one or more custom event metadata tags from the user. For example, the user can report how productive the business meeting was by assigning a number between 1 and 10 to the "productivity level" metadata tag; how the user felt during the theatrical play by choosing a state of mind that best describes the feeling (happy, sad or indifferent) for the "mood" metadata tag; what kind of exercise and how many sets of that kind the user repeated by entering the routine information (×40 pushups, ×10 pull-ups, cycling 5 miles etc.) under "exercise routine" metadata tag; whether the user was on time on Monday by answering "yes" or "no" to the "on time for work?" metadata tag and what kind of food was had at a dinner by identifying the food (whole sandwich, ravioli, sushi, etc.) or identifying primary ingredients in the food (seafood, gluten, alcohol, spice, beans, eggs, etc.) under "diet" metadata tag, etc. The determination of whether the user is on time for work can be made based on metadata provided by the user or metadata provided by an application that detects the user's location as a function of time. For example, the user can define on time as 9:00 am and the metadata module 205 determines that the user is late if the user arrives at 9:30 am.

In the instance where the user consents to the user of such data, the metadata module 205 retrieves the event metadata associated with the one or more events by processing the information in the one or more calendars of the user. For example, the metadata module 205 can determine the total number of hours spent by the user attending business meetings, the total number of hours spent by the user working on a business project, the total number of hours the user slept on each day, the total number of hours the user practiced yoga in a week, the number of days the user was on vacation in a year, etc.

In the instances where the user consents to the use of such data, the metadata module 205 queries the web servers 111 for user metadata. The user metadata is associated with the user creating the one or more events. The user metadata is retrieved from the web servers 111, for example, through the use of an application programming interface (API). For example, the metadata module 205 can retrieve a location history of the user from a web mapping service (since the location of the user device 115 is mapped on the web mapping service). A location is a record of where the user was at a given time (e.g., latitude, longitude, altitude, etc.). A location history is a collection of positions of the user stored as a time series (e.g., timestamps) on the web mapping service. Using the retrieved location history, the metadata module 205 can determine the user metadata including, for example, a number of miles the user traveled each day, a number of hours the user spent at home, the amount of time the user spent being stationary at a particular location, etc. For example, the metadata module 205 receives gym check-ins from the social network application generated by the social network server 101 or another online service engine 209. In another example, the metadata module 205 can retrieve real-time weather data at the user's location from an online weather service. The real-time weather data can be used to determine the user metadata including an amount of daylight, an amount of sunlight, inches of rainfall, inches of snowfall, humidity level, wind speed, percentage of cloud cover, air quality, etc.

In the instances where the calendar server 107, the social network server 101 and the web servers 111 are the same server or are at least controlled by the same entity, the metadata module 205 can retrieve online activity of the user on the servers and identify it as the user's metadata. The online user activity can include, for example, log-ins, emails sent, emails received, web search activity, top queries, number of searches, number of hours spent online, etc. In some other instances, the metadata module 205 determines the length of user activity on the user device 115 as the user metadata. For example, the metadata module 205 can measure the length of user activity by determining the time in going from idle to screensaver mode in the user device 115 and the number of times the user device 115 goes into a screensaver mode per day.

In some other instances, the metadata module 205 receives from the user a selection of types of event metadata for associating with the one or more events and types of user metadata for associating with the user. The selected types of event metadata and user metadata are aggregated by the metadata module 205 and stored in the storage device 243. For example, the user may not wish to associate a "produc- tivity level" metadata tag with a business meeting event, etc. In another example, the user may wish to associate "on time for work?" metadata tag to each day of the current week, etc.

In some other instances, the metadata module 205 determines one or more connections between one or more types of metadata aggregated for the user in the storage device 243. For example, a connection can be determined between the metadata collected for a jogging event and the metadata collected for a dinner event. The one or more connections can be determined from the one or more types of metadata over a period of time. The one or more connections can point to a state that the user is striving to attain or maintain. For example, the user can be striving to lose weight or maintain the current weight. In some instances, the metadata module 205 identifies the state as a goal for the user. For example, the metadata module 205 can identify a goal for the user as to "weigh 140 lbs.," "be on time for work more often" or "stay as happy as possible,"etc.

The user preference engine 207 can be code and routines for associating a sharing level to one or more types of metadata aggregated by the metadata module. In some instances, the user preference engine 207 can be a set of instructions executable by the processor 235 to provide the functionality described below for associating sharing levels to the metadata. In some other instances, the user preference engine 207 can be stored in the memory 237 of the computing device 200 and can be accessible and executable by the processor 235. In either of the instances, the user preference engine 207 can be adapted for cooperation and communication with the processor 235, the controller 201, the metadata module 205, and other components of the journal application 103.

In some instances, the user preference engine 207 receives from the user a sharing level to be associated with the one or more types of metadata. The sharing level can be one of a public sharing level, a private sharing level and a default sharing level. The user preference engine 207 transmits the one or more types of metadata to the social network server 101. The one or more types of metadata can be shared to the social network of the user based on the sharing level. When the sharing level is a public sharing level associated with the one or more types of metadata, the preference engine 207 shares the one or more types of metadata on the social network. For example, the user may want to share the experience at a musical concert with all the users of the social network by associating a public sharing level to a "mood" metadata tag. When the sharing level is a private sharing level associated with the one or more types of the metadata, the preference engine 207 does not share the one or more types of metadata on the social network. For example, the user avoids sharing the kind of dinner that was had at a dinner party with the social network by associating a private sharing level to the "diet" metadata tag. In some instances, the private sharing level associated with the one or more types of metadata includes one or more groups of users (e.g., work, school, family, etc.) on the social network of the user. For example, the user shares his or her exercise routines only with a fitness group on the social network by associating the fitness group with the "exercise routine" metadata tag. A default sharing level associated with the one or more types of metadata mimic the sharing level of the user's calendar. If the user's calendar is public, for example, all of the one or more types of metadata have a public sharing level.

The action engine 209 can be code and routines for executing one or more actions based on the metadata associated with the one or more events and the user. In some instances, the action engine 209 can be a set of instructions executable by the processor 235 to provide the functionality described below for executing the one or more actions. In some other instances, the action engine 209 can be stored in the memory 237 of the computing device 200 and can be accessible and executable by the processor 235. In either of the instances, the action engine 209 can be adapted for cooperation and communication with the processor 235, the controller 201, the metadata module 205 and other components of the journal application 103.

The action engine 209 receives one or more types of event metadata and user metadata from the metadata module 205 or retrieves one or more types of event metadata and user metadata from the storage device 243. The action engine 209 determines one or more actions based on the one or more types of event metadata and user metadata. In some instances, the action engine 209 instructs the user interface engine 213 to generate graphical data for displaying notifications. The notifications can be for obtaining permission from the user for executing the one or more actions. For example, the action engine 209 identifies that the user reports a higher number on the numeric scale 1-10 for "my productivity" metadata tag whenever the level of sunlight is higher. The action engine 209 then determines from the user metadata that the weather for the present day is cloudy. The action engine 209 requests permission from the user to calibrate the monitor of the user device 115 to brighten the gamma level.

In another example, the action engine 209 identifies that the user answered "no" to the "on time for work?" metadata tag associated with the previous day. The action engine 209 then determines the route the user took to reach his or her workplace the previous day. The route can be determined to be a non-highway route from the location history (user metadata). The action engine 209 then requests permission from the user to calibrate the Global Positioning System (GPS) device for a highway route to reach the workplace.

In a third example, the action engine 209 identifies that the user answered "happy" to the "my mood today" metadata tag on a certain weekday. The action engine 209 then determines that the user jogged for an hour in the morning on that weekday from the event metadata. The action engine 209 requests permission to add a jogging event to the calendar on behalf of the user. The jogging event can be added to the same weekday for next week. The action engine 209 executes the one or more actions once the permission is received from the user. In another embodiment, the action engine 209 receives instructions from the user to automatically create events after determining the action to be taken.

The suggestion engine 211 can be code and routines for generating one or more suggestions and instructing the user interface engine 213 to generate graphical data for displaying the one or more suggestions to the user. In some instances, the suggestion engine 211 can be a set of instructions executable by the processor 235 to provide the functionality described below for generating one or more suggestions. In some other instances, the suggestion engine 211 can be stored in the memory 237 of the computing device 200 and can be accessible and executable by the processor 235. In either of the instances, the suggestion engine 211 can be adapted for cooperation and communication with the processor 235, the action engine 209, the calendar module 203, and other components of the journal application 103.

In some instances, the suggestion engine 211 processes the one or more goals set by the user in the calendar. The suggestion engine 211 determines an effect of the one or more actions on the one or more goals set by the user. For example, the suggestion engine 211 can determine whether the action of brightening the gamma level on the monitor of the user device 115 led to the user reporting a higher number on the numeric scale 1-10 for productivity. In another example, the suggestion engine 211 can determine whether the action of calibrating the route to work through a highway on the GPS device led to the user reducing his or her commuting time on weekdays. The suggestion engine 211 can identify whether the user answered "yes" on the "on time for time?" metadata tag. In a third example, the suggestion engine 211 can determine whether the action of creating a jogging event in the calendar led to the user indicating as being "happy" on the "my mood today" metadata tag for days following the jogging event.

In some instances, the suggestion engine 211 sends instructions to the user interface engine 213 for displaying one or more suggestions to the user. The one or more suggestions can be displayed to the user responsive to determining the effect of the one or more actions on the one or more goals set by the user. For example, the suggestion engine 211 can suggest to the user to buy daylight bulbs to maximize productivity at work. In another example, the suggestion engine 211 can suggest to the user to decrease the color temperature of the monitor's white balance as the day progresses to aid in sleeping better at night. In another example, the suggestion engine 211 can suggest adjusting a purchase quantity of one or more items that have an effect on one or more goals, for example, decreasing the purchase of junk food. In another example, the suggestion engine 211 can suggest to the user to continue commuting to work through the highway on weekdays to reduce commuting time. In a third example, the suggestion engine 211 can suggest to the user to jog on Tuesdays and Thursdays to feel better throughout the week. In some other instances, the one or more suggestions can be processed for the user responsive to receiving instructions from the user granting permission to generate the one or more suggestions.

The user interface engine 213 can be code and routines for generating graphical data for providing user interfaces to users. In some instances, the user interface engine 213 can be a set of instructions executable by the processor 235 to provide the functionality described below for generating graphical data for providing user interfaces that includes information from the calendar server 107, the social network server 101 and the web servers 111. In some other instances, the user interface engine 213 can be stored in the memory 237 of the computing device 200 and is accessible and executable by the processor 235. In either of the instances, the user interface engine 213 can be adapted for cooperation and communication with the processor 235 and other components of the journal application 103.

In some instances, the user interface engine 213 receives instructions from the calendar module 203 to generate graphical data that depicts an electronic calendar or a user interface for adding, dropping and viewing an event. An example of a user interface for adding an event is illustrated below as FIG. 3. In some other instances, the user interface engine 213 generates graphical data for subscribed content based at least in part on instructions from the online service engine 109. For example, the user interface engine 213 generates graphical data for displaying calendars, weather forecasts, location history, maps, etc. The user interface engine 213 sends the graphical data to an application (e.g., a browser) in the user device 115 via the communication unit 241 causing the application to display the data in a user interface.

In some instances, the user interface engine 213 receives instructions from the calendar module 203 to generate graphical data for displaying one or more calendars. In some other instances, the user interface engine 213 receives a user action corresponding to the one or more calendars. The term user action includes any action performed by the user 125 using the user interface provided to the user 125. The user action includes adding, dropping or viewing events on the calendar, reporting on metadata tags for the events in the calendar, switching to another calendar in the browser window, hiding the display of the calendar, etc. The user interface engine 213 updates the graphical data in response to the received user actions. Examples of user interfaces including graphical data that displays the one or more calendars are explained in further detail with reference to FIGS. 4-7.

Figure 3:
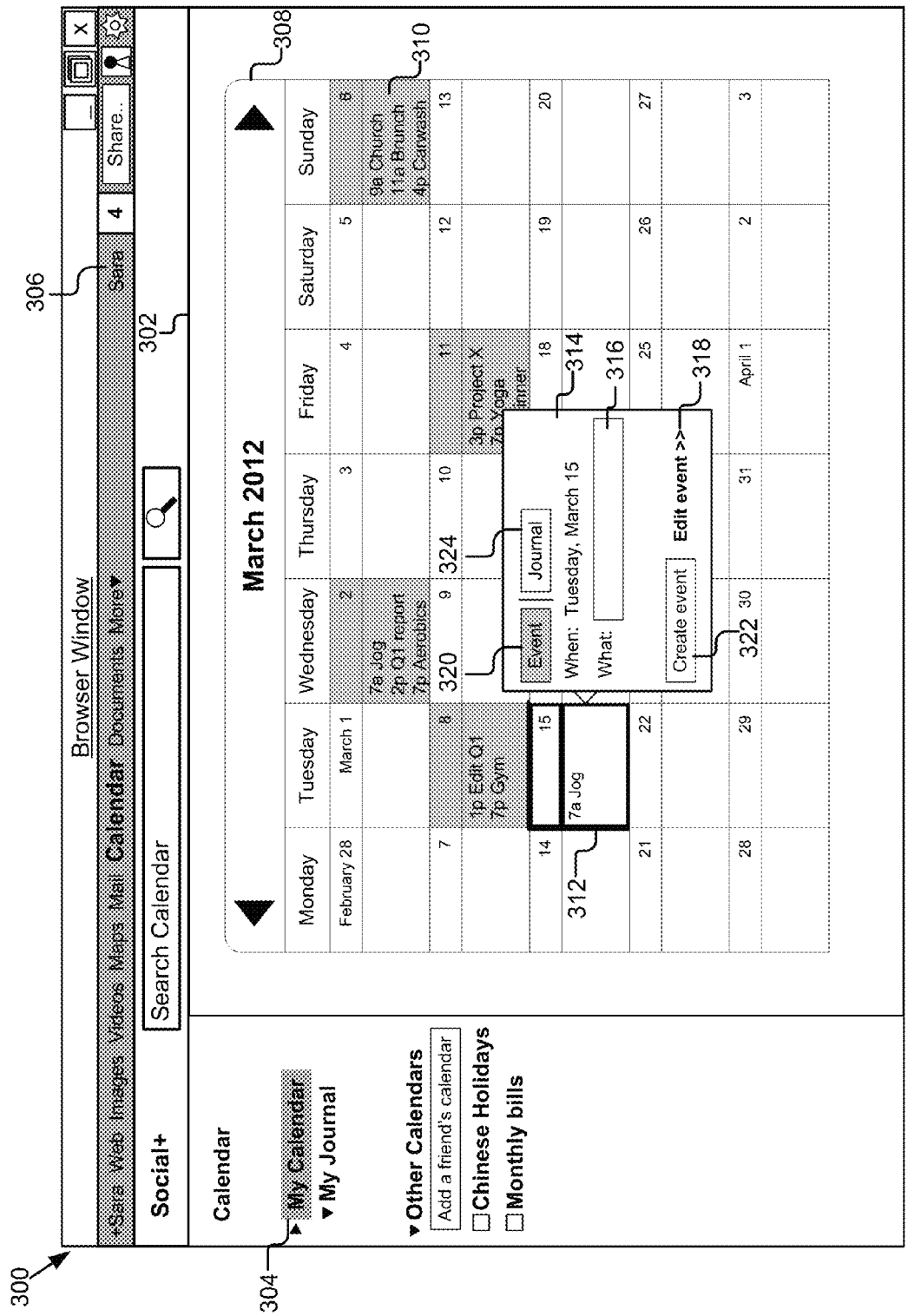
FIG. 3 is an example graphic representation of a user interface for creating an event in the calendar.

Turning now to FIG. 3, one example of a graphical representation of a user interface 300 for creating an event in an electronic calendar is illustrated. The user interface 300 displays a calendar page 302 under the "My Calendar" tab 304 in a social network associated with the user Sara 306. Other implementations can be possible where the journal application 103 is not integrated with the social network. The calendar page 302 displays the interactive calendar 308. The interactive calendar 308 is displayed in a monthly view mode. Other implementations can be possible where the interactive calendar 308 is displayed in other view modes, for example, daily, weekly, agenda, etc. The interactive calendar 308 lists the scheduled events 310 for a calendar day in the month of March. When the user Sara 306 selects a slot 312 in the interactive calendar 308 a pop-up menu 314 is displayed next to the slot 312. In the pop-up menu 314 the user Sara 306 can select the event tab 320 to quickly create an event. The user Sara 306 can type standard English phrases, for example, "Business meeting at 1 PM" into the "What" field 316 and create the event by clicking the "Create event" button 322. In some instances, the user Sara 306 can select the "Edit event" option 318 to edit the event to add more information. Upon clicking the "Edit event" option 318 the user Sara 306 is directed to the events page which is explained in further detail with reference to FIG. 4. The pop-up menu 314 also includes a journal tab 324. Upon clicking the journal tab 324 the user Sara 306 is directed to the journal page which is explained in further detail with reference to FIG. 6.

Figure 4:
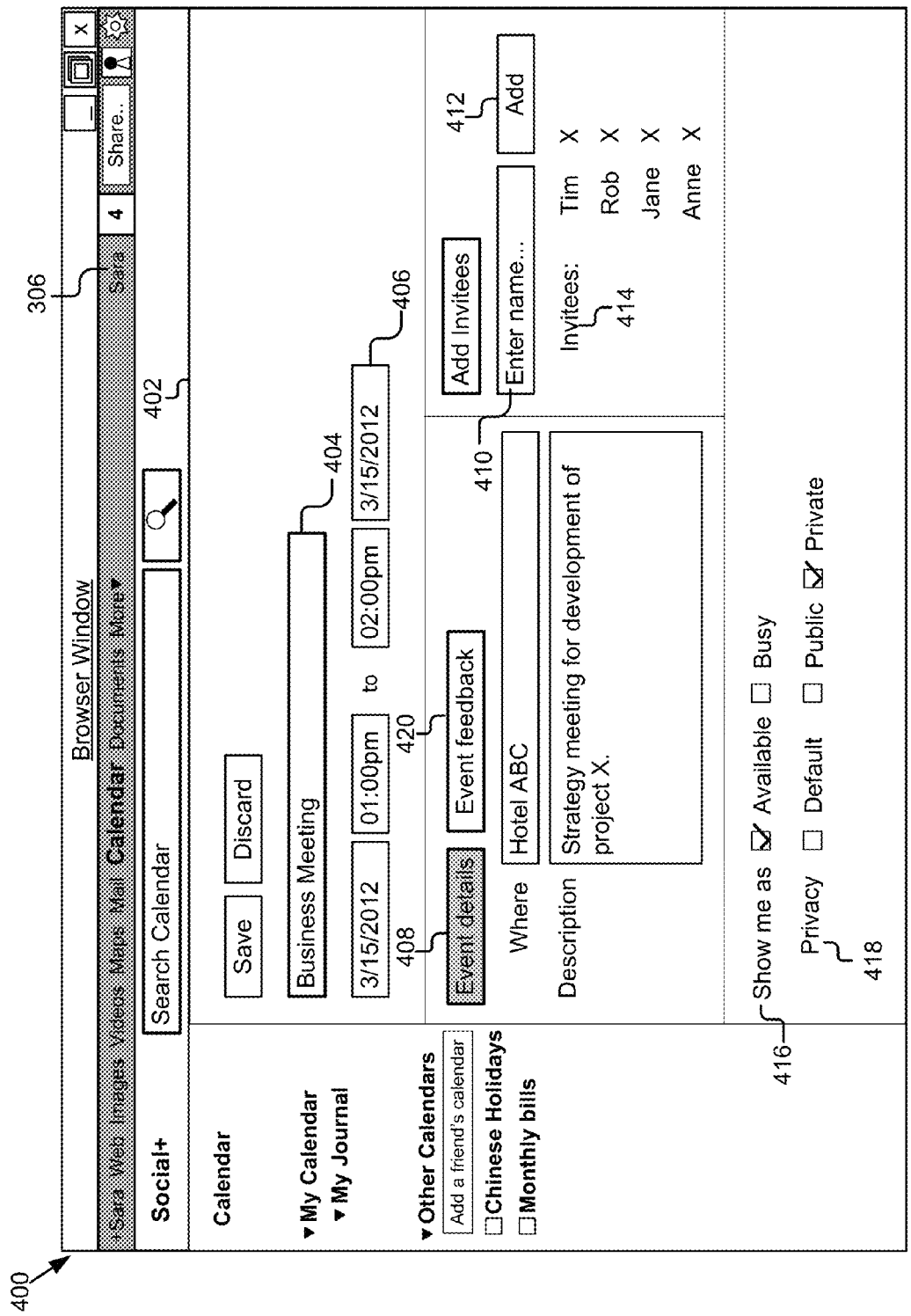
FIG. 4 is an example graphic representation of a user interface for editing the event in the calendar.

FIG. 4 illustrates an example graphical representation of a user interface 400 for editing the event in the electronic calendar. The user interface 400 displays an events page 402 that is reached in response to the user Sara 306 clicking the "Edit event" option 318 in FIG. 3. The user Sara 306 enters the title of the event by typing the title into the title field 404. The user Sara 306 also inputs the date and time for the event under the date and time fields 406. Under "Event details" tab 408 the user Sara 306 can enter the location where the event is taking place in the "Where" field and provide a short description of the event in the "Description" field. The user Sara 306 can then invite one or more users to the event by entering a name in the name field 410 and clicking the add button 412. In another example, the user Sara 306 can enter an email identifier associated with the one or more users for the purpose of inviting the one or more users to the event. Once the user Sara 306 is done inviting, the user interface 400 displays the list 414 of invitees added by the user Sara 306 for easy reference. The user Sara 306 can indicate a change in his or her availability for the event later on either by checking the available radio button or the busy radio button beside the "Show me as" option 416. The user Sara 306 can also designate the event as public or private either by checking the public radio button or the private radio button beside the "Privacy" option 418. In some instances, the user Sara 306 can select the "Event feedback" option 420 to create metadata tags and report on the metadata tags associated with the event. Upon clicking the "Event feedback" option 420 the user Sara 306 is directed to the feedback page which is explained in further detail with reference to FIG. 5.

Figure 5:
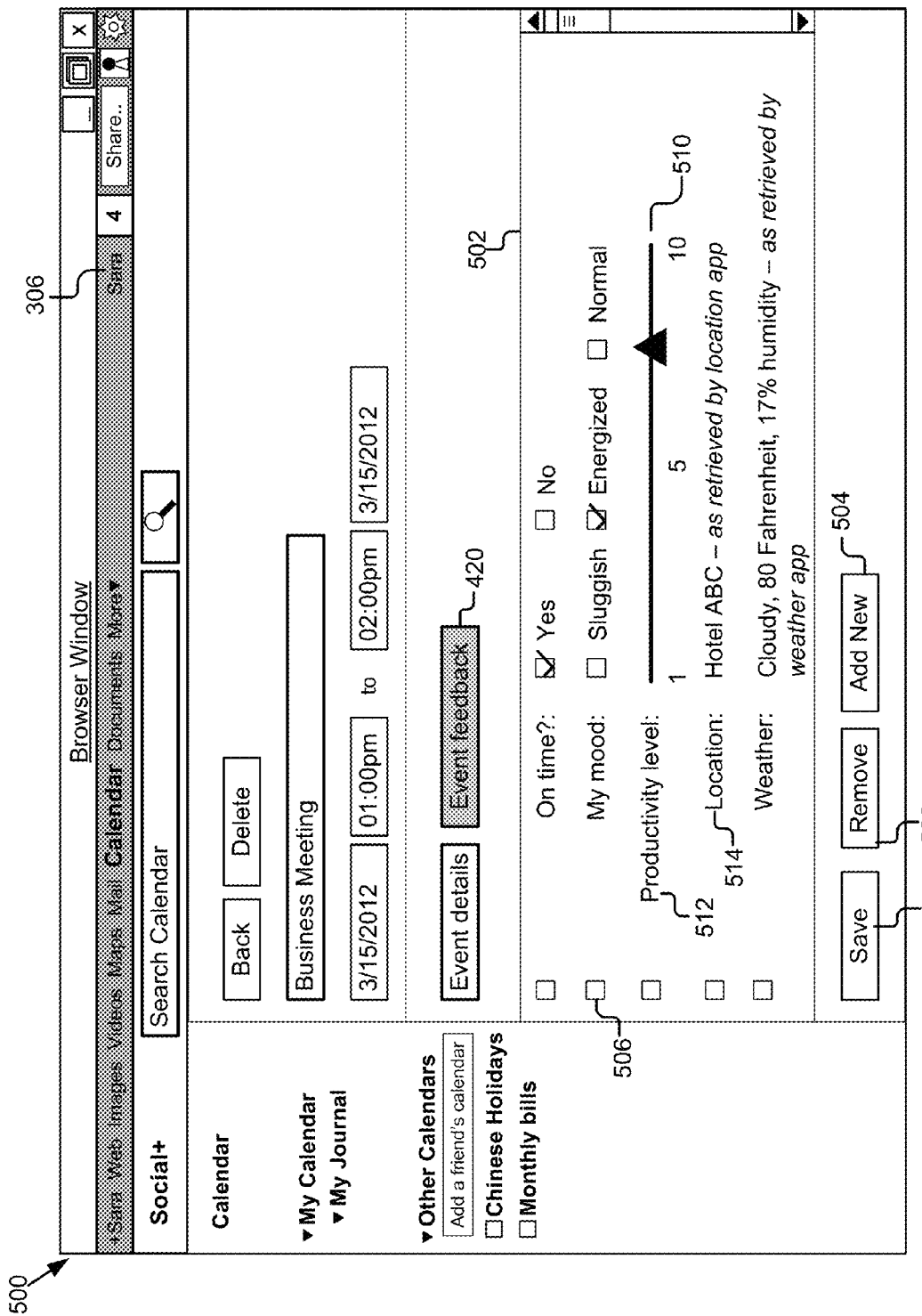
FIG. 5 is an example graphic representation of a user interface for creating metadata tags and aggregating the metadata for the metadata tags in the calendar.

FIG. 5 illustrates an example graphical representation of a user interface 500 for creating metadata tags and aggregating the metadata for the metadata tags in the electronic calendar. The user interface 500 displays an event feedback sub window 502 that is opened upon the user Sara 306 clicking on the "Event feedback" option 420 in FIG. 4. The user Sara 306 can create a custom metadata tag associated with the event "Business Meeting" by clicking on the "Add New" button 504. For example, the "Productivity level" metadata tag 512 is a custom metadata tag created by the user Sara 306. In some instances, the metadata tags can be processed from a user subscription to an online service. For example, the "Location" metadata 514 is processed from a web mapping service. The user Sara 306 can identify the type of metadata tags by checking the radio button 506 next to each metadata tag. The user Sara 306 can then remove the identified metadata tags by clicking the "Remove" button 508. Once the event "Business Meeting" has ended the user Sara 306 can return to event feedback sub window 502 and provide feedback on the metadata tags and click the "Save" button 516. For example, the user 306 can use the numeric scale 510 to indicate the productivity of the "Business meeting" event after the event has ended.

Figure 6:
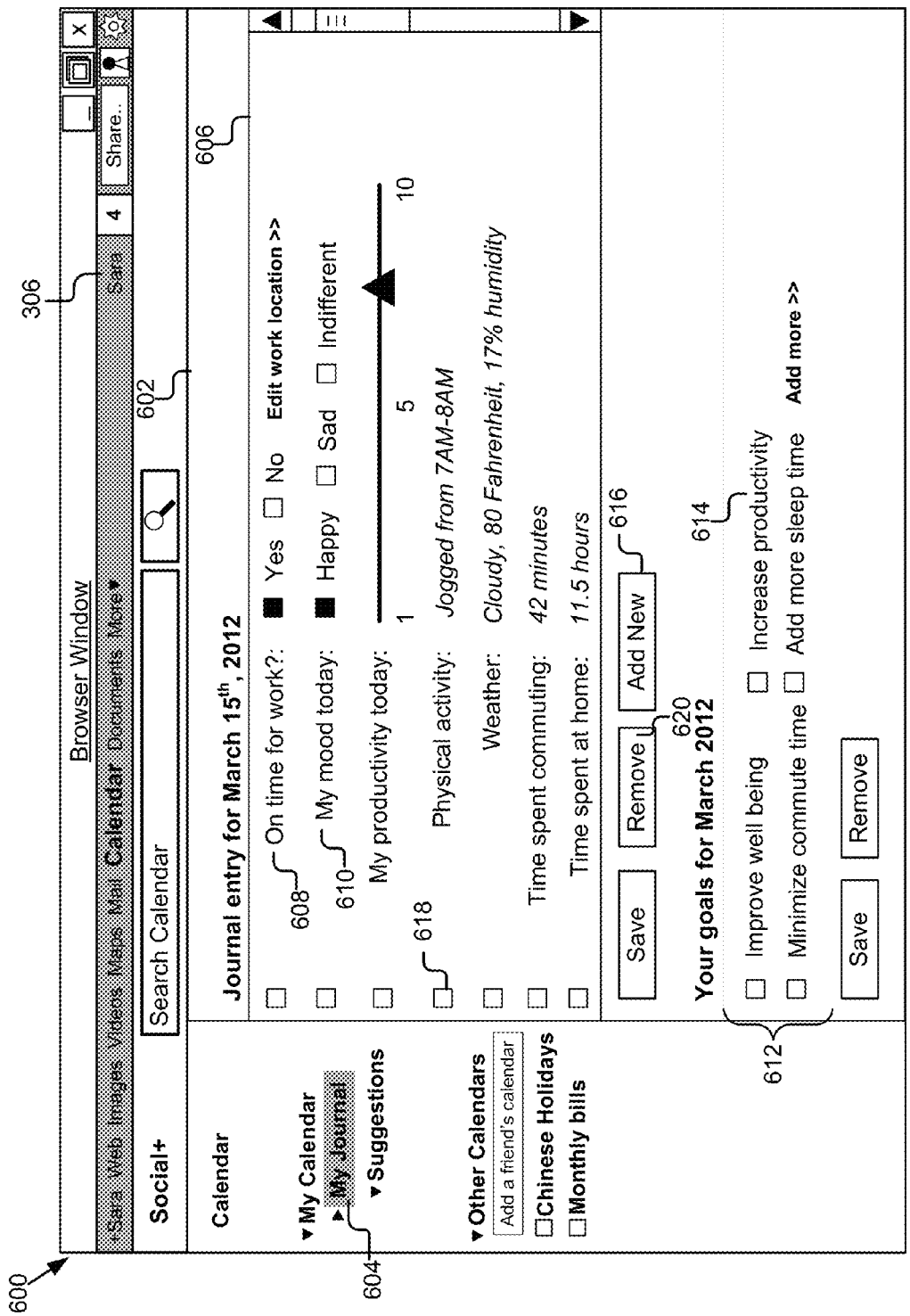
FIG. 6 is an example graphic representation of a user interface for receiving journal metadata of a day in the user's life in the calendar.

FIG. 6 illustrates an example of a graphical representation of a user interface 600 for receiving journal metadata of a day in the user's life in the calendar. The user interface 600 displays a journal page 602 that is reached upon the user Sara 306 clicking on the journal tab 324 in FIG. 3. In some instances, the journal page 602 can be reached by clicking on the "My journal" tab 604 in the calendar. The journal page 602 includes a scrollable sub window 606 where the user Sara 306 can submit his or her journal metadata. For example, the user Sara 306 can either check "Yes" or "No" on the journal metadata "On time for work?" 608 for Mar. 15, 2012. In another example, the user Sara 306 can check a state of mind that best describes how the user Sara 306 felt during the day by either checking Happy, Sad or Indifferent mood indicators on the journal metadata "My mood today" 610. The journal page 602 also includes a section where the user Sara 306 can set one or more goals 612 in the calendar. The one or more goals 612 set can be short term or long term goals. For example, the user Sara 306 can set a goal "Increase productivity" 614 as a long term goal in the calendar. As mentioned above in FIG. 5 the user Sara 306 can create a custom journal metadata tag for the day by clicking on "Add New" button 616. The user Sara 306 can identify the type of journal metadata by checking the radio button 618 next to each journal metadata tag. The user Sara 306 can then remove the identified journal metadata by clicking the "Remove" button 620.

Figure 7:
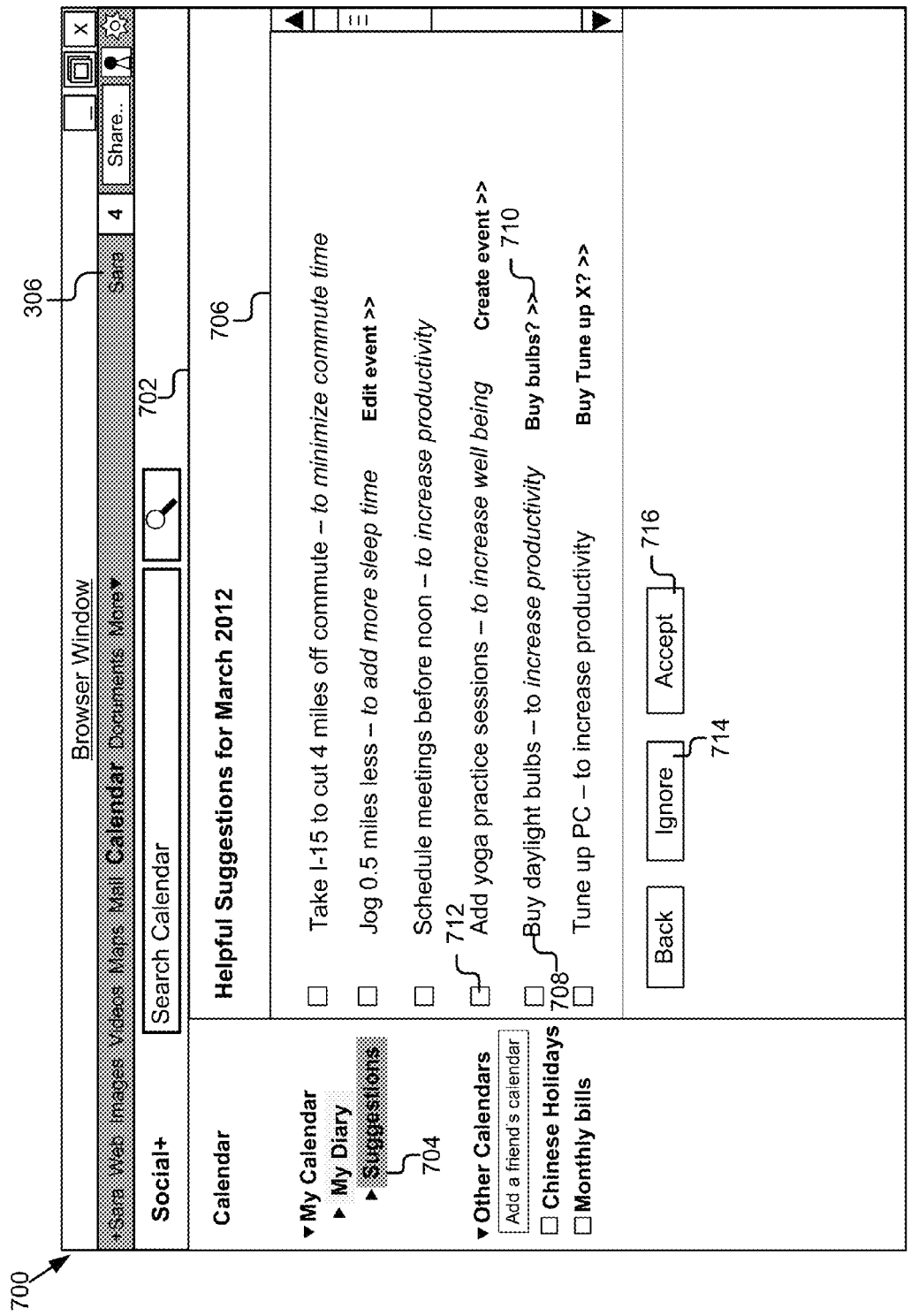
FIG. 7 is an example graphic representation of a user interface for providing one or more suggestions to the user in the calendar.

FIG. 7 illustrates an example of a graphical representation of a user interface 700 for providing one or more suggestions to the user in the calendar. The user interface 700 displays the suggestion page 702 when the user Sara 306 clicks on the suggestions tab 704. In some instances, the action engine 209 determines one or more actions based on one or more types of metadata received. When the one or more actions are executed by the action engine 209 there is an effect on the one or more goals set by the user. The suggestion engine 211 determines the effect of the one or more actions on the one or more goals. The suggestion engine 211 then provides one or more suggestions to the user responsive to determining the effect. The suggestion page 702 displays a scrollable sub window 706 displaying the one or more suggestions. For example, the user Sara 306 can view a suggestion "Buy daylight bulbs" 708 that can increase productivity. The sub window 706 includes a clickable link "Buy bulbs?" 710 to take the user to an online shopping website to make the purchase. As mentioned above in FIG. 5 the user Sara 306 can identify the suggestion by checking the radio button 712 next to each suggestion. The user Sara 306 can then choose to ignore the suggestion by clicking on the "Ignore" button 714 or accept the suggestion by clicking on the "Accept" button 716.

Figure 8:
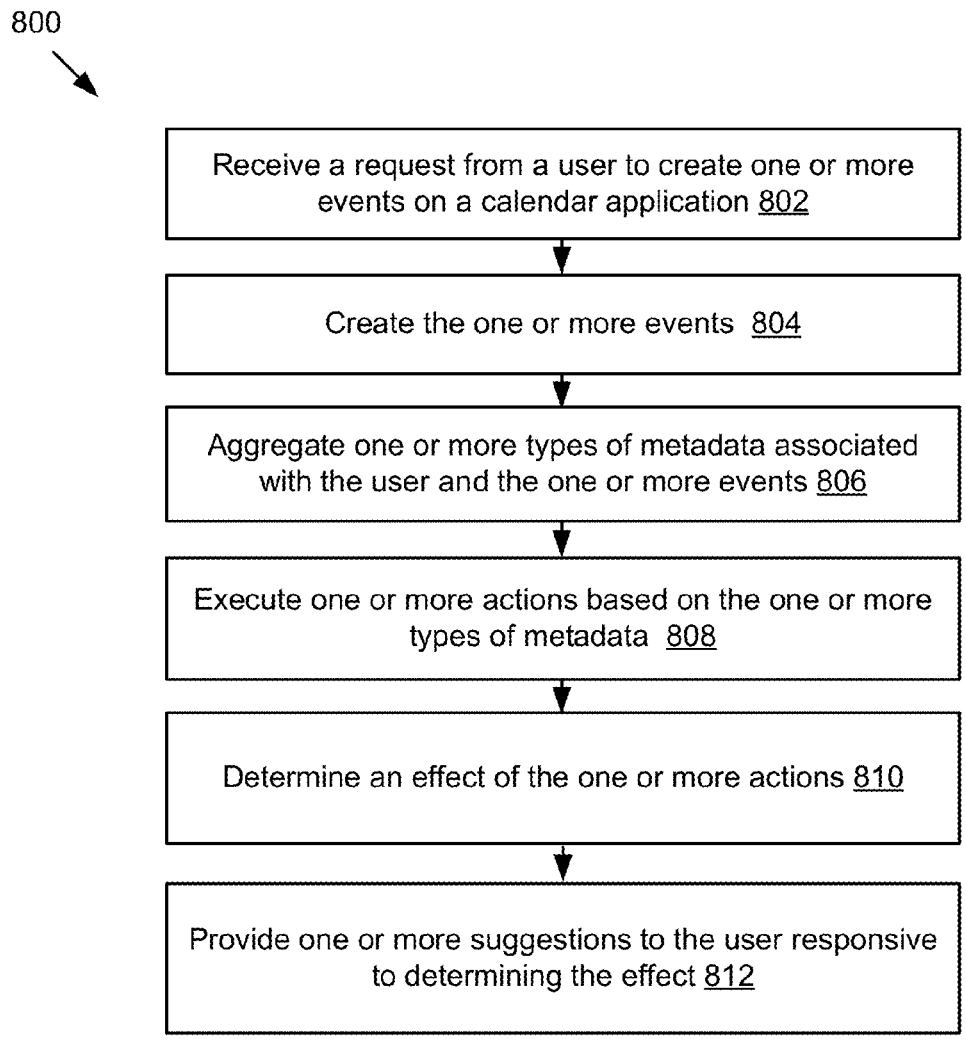
FIG. 8 is a flow diagram of an example method for providing one or more suggestions to the user in the calendar.

FIG. 8 is a flow diagram 800 of an example of a method for providing one or more suggestions to the user. The journal application 103 includes a calendar module 203, a metadata module 205, an action engine 209 and a suggestion engine 211. The calendar module 203 receives 802 a request from a user to create one or more events in a calendar. The one or more events can be public or private. The one or more events can also include a list of attendees. For example, the calendar event can be a business meeting with colleagues. The calendar module 203 creates 804 the one or more events in the calendar. The metadata module 205 aggregates 806 one or more types of metadata associated with the user and the one or more events. In some instances, the metadata can be custom metadata tags provided by the user. For example, "my productivity today," "on time for work," "mood," etc. The action engine 209 executes 808 one or more actions based on the one or more types of metadata. For example, the action can be calibrating the monitor of the user device 115 to brighten the gamma level. The suggestion engine 211 determines 810 an effect of the one or more actions and provides 812 one or more suggestions to the user responsive to determining the effect. For example, the action of brightening the gamma level on the monitor leads to the user being productive and the user can be suggested to buy daylight bulbs, etc.

Figure 9:
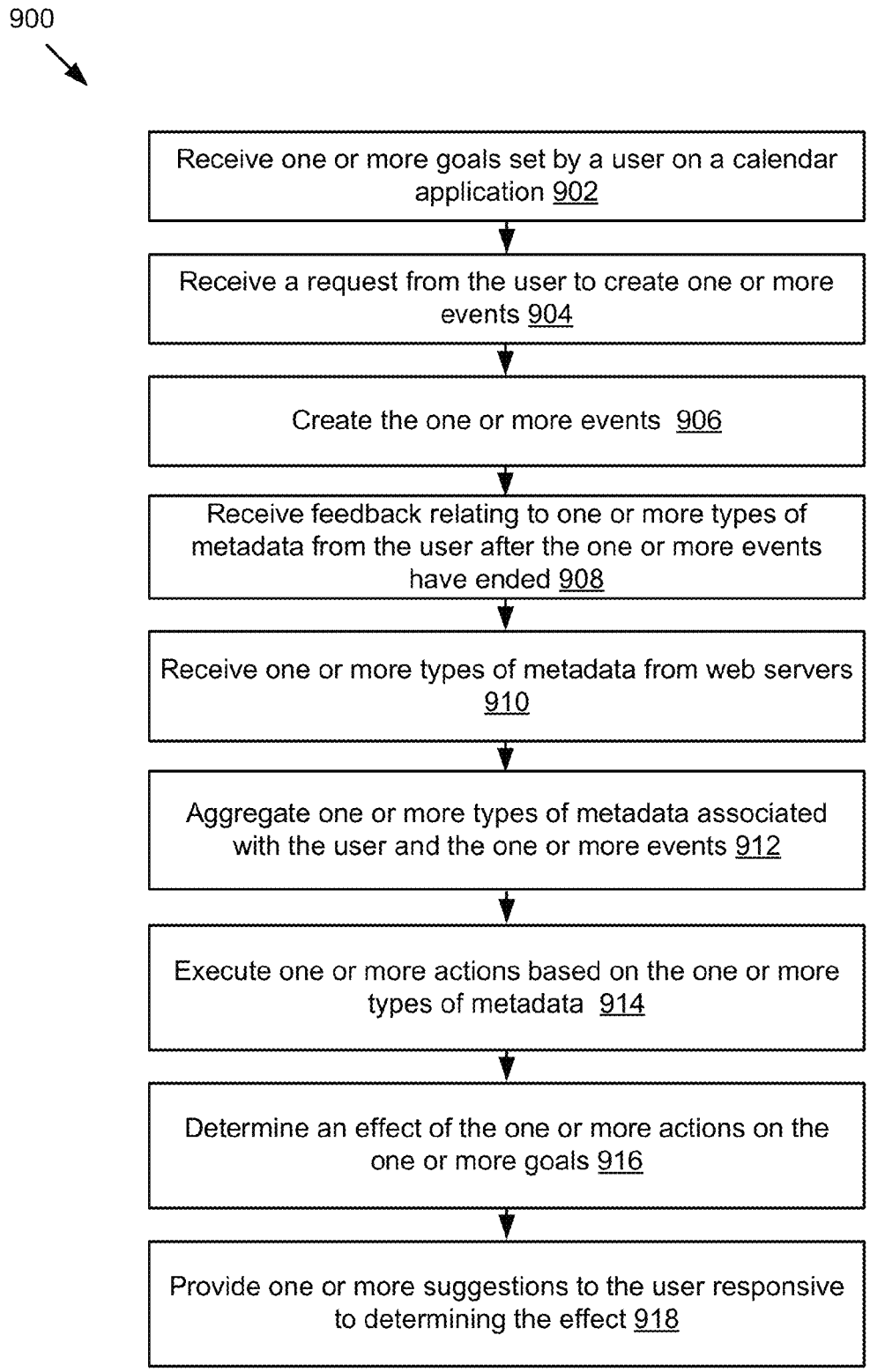
FIG. 9 is a flow diagram of another example method for providing one or more suggestions to the user in the calendar.

FIG. 9 is a flow diagram 900 of an example of another method for providing one or more suggestions to the user. The one or more suggestions are based on an effect observed on one or more goals set by the user. The journal application 103 includes a calendar module 203, a metadata module 205, an action engine 209 and a suggestion engine 211. The calendar module 203 receives 902 one or more goals set by a user on a calendar application. For example, the user sets a goal of improving the user's running time. The calendar module 203 receives 904 a request from a user to create one or more events on the calendar application. For example, the user sets up a running schedule. The calendar module 203 creates 906 the one or more events in the calendar.

The metadata module 205 receives 908 feedback relating to one or more types of metadata from the user after the one or more events have ended and identifies correlations between the metadata and the outcomes. For example, the metadata module 205 receives an indication that the user felt energized during the run. This can be a useful way of connecting the user's sleep patterns with the run. If the user slept well the night before and felt energized during the run, this is a strong indicator that there is a correlation between the amount of sleep the user gets and the pace of the run. The more frequently the pace of the run (outcome) is connected with the user indicating feeling energized (metadata), the more likely that the feeling of being energized (metadata) is connected to the pace of the run (outcome).

The metadata module 205 receives 910 one or more types of metadata from web servers 111. For example, the user instructs a first web server 111 that tracks the user's runs to send the user's location (e.g., from Global Positioning System data) and other statistics about the run (e.g., time, fastest pace, etc.) to the metadata module 205. Other web servers 111 provide information about the weather conditions and information about traffic conditions. In another example, the user instructs a second web server 111 to transmit information to the metadata module 205 about the user's sleeping patterns (e.g., how much sleep the user gets, how restful the sleep is based on the number of times the user gets up during the night, etc.). In yet another example, a third web server 111 transmits a list of the user's purchases to the metadata module 205.

The metadata module 205 aggregates 912 one or more types of metadata associated with the user and the one or more events. For example, in the instance where the user consents to the use of such data, the metadata module 205 associates the weather, the traffic conditions, the user's running route and the user's sleeping schedule with metadata for particular runs. This can be helpful to identify patterns. For example, the user's Tuesday run was at a slower pace than the user's Monday run because it was raining and the traffic was slow in the areas where the user was running In another example, the user's Wednesday run was at an even slower pace than the user's Tuesday run because the user only got three hours of sleep.

The action engine 209 executes 914 one or more actions based on the one or more types of metadata. For example, the action engine 209 schedules an event specifying when the user should fall asleep because in the past an earlier bedtime resulted in a more restful sleep for the user. The suggestion engine 211 determines 916 an effect of the one or more actions on the one or more goals. The suggestion engine 211 provides 918 one or more suggestions to the user responsive to determining the effect. For example, the suggestion engine 211 suggests that the user purchase a pair of running shoes because, based on the buying history received from the web server 111, it has been over a year since the user bought new running shoes. The suggestion engine 211 also suggests a new running route for the user to avoid heavy congestion or a new time for running to avoid morning showers expected during the user's Friday run.

In the above description, for purposes of explanation, numerous specific details are set forth in order to provide a thorough understanding of the specification. It will be apparent, however, to one skilled in the art that the specification can be practiced without these specific details. In other instances, structures and devices are shown in block diagram form in order to avoid obscuring the description. For example, the present implementation is described in one instance below primarily with reference to user interfaces and particular hardware. However, the present implementation applies to any type of computing device that can receive data and commands, and any peripheral devices providing services.

Reference in the specification to "some instances" or "an instance" means that a particular feature, structure, or characteristic described in connection with the instance is included in at least some instances of the description. The appearances of the phrase "in some instances" in various places in the specification are not necessarily all referring to the same instance.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining" "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementation of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of an entirely hardware instance, an entirely software instance or an instance containing both hardware and software elements. In a preferred implementation, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the instances of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving, using a computing device, a request from a user to create a first event in a calendar;
creating, using the computing device, the first event in the calendar;
associating, using the computing device, one or more types of metadata with the user and the first event;

aggregating, using the computing device, the one or more types of metadata for the first event to create aggregated metadata;
determining, using the computing device, an action based on the aggregated metadata;
executing, using the computing device, the action in a second event subsequent to the first event;
responsive to executing the action, receiving, using the computing device, a feedback of the user on the second event;
determining, using the computing device, an effect of executing the action on a goal associated with the user based on the feedback of the user on the second event;
responsive to determining the effect of executing the action, determining, using the computing device, a suggestion for the user based on the effect of executing the action; and
providing, using the computing device, the suggestion to the user.

2. The computer-implemented method of claim 1, further comprising:
associating, using the computing device, a sharing level to the one or more types of metadata; and
sharing, using the computing device, the one or more types of metadata to an online service based on the sharing level.

3. The computer-implemented method of claim 1, further comprising, receiving, using the computing device, a custom metadata tag for the first event from the user, the custom metadata tag corresponding to the one or more types of metadata.

4. The computer-implemented method of claim 1, further comprising querying, using the computing device, a web server to determine the one or more types of metadata.

5. The computer-implemented method of claim 1, further comprising, associating, using the computing device, a predefined group of second users with the one or more types of metadata.

6. The computer-implemented method of claim 5, further comprising receiving, using the computing device, an input from the user at the creation of the first event, the input selecting the predefined group of second users from among a plurality of groups of second users.

7. The computer-implemented method of claim 1, wherein the sharing level includes a default sharing level, the default sharing level replicating a calendar sharing level associated with the calendar in which the first event is created.

8. A system comprising:
a computer processor; and
a non-transitory computer readable medium storing instructions that, when executed by the computer processor, are configured to:
receive a request from a user to create a first event in a calendar;
create the first event in the calendar;
associate one or more types of metadata with the user and the first event;
aggregate the one or more types of metadata for the first event to create aggregated metadata;
determine an action based on the aggregated metadata;
execute the action in a second event subsequent to the first event;
responsive to executing the action, receiving a feedback of the user on the second event;
determine an effect of executing the action on a goal associated with the user based on the feedback of the user on the second event;
responsive to determining the effect of executing the action, determine a suggestion for the user based on the effect of executing the action; and
provide the suggestion to the user.

9. The computer-implemented method of claim 8, wherein the instructions that, when executed by the computer processor, are further configured to:
associate a sharing level to the one or more types of metadata; and
share the one or more types of metadata to an online service based on the sharing level.

10. The computer-implemented method of claim 8, wherein the instructions that, when executed by the computer processor, are further configured to receive a custom metadata tag for the first event from the user, the custom metadata tag corresponding to the one or more types of metadata.

11. The computer-implemented method of claim 8, wherein the instructions that, when executed by the computer processor, are further configured to query a web server to determine the one or more types of metadata.

12. The computer-implemented method of claim 8, wherein the instructions that, when executed by the computer processor, are further configured to associate a predefined group of second users with the one or more types of metadata.

13. The computer-implemented method of claim 12, wherein the instructions that, when executed by the computer processor, are further configured to receive an input from the user at the creation of the first event, the input selecting the predefined group of second users from among a plurality of groups of second users.

14. The computer-implemented method of claim 8, wherein the sharing level includes a default sharing level, the default sharing level replicating a calendar sharing level associated with the calendar in which the first event is created.

15. A computer program product comprising a non-transitory computer readable medium encoding instructions that, in response to execution by a computing device, cause the computing device to perform operations comprising:
receiving a request from a user to create a first event in a calendar;
creating the first event in the calendar;
associating one or more types of metadata with the user and the first event;
aggregating the one or more types of metadata for the first event to create aggregated metadata;
determining an action based on the aggregated metadata;
executing the action in a second event subsequent to the first event;
responsive to executing the action, receiving a feedback of the user on the second event;
determining an effect of executing the action on a goal associated with the user based on the feedback of the user on the second event;
responsive to determining the effect of executing the action, determining a suggestion for the user based on the effect of executing the action; and
providing the suggestion to the user.

16. The computer program product of claim 15, wherein the operations further comprise:
associating a sharing level to the one or more types of metadata; and sharing the one or more types of metadata to an online service based on the sharing level.

17. The computer program product of claim 15, wherein the operations further comprise receiving a custom metadata tag for the first event from the user, the custom metadata tag corresponding to the one or more types of metadata.

18. The computer program product of claim 15, wherein the operations further comprise querying a web server to determine the one or more types of metadata.

19. The computer program product of claim 15, wherein the operations further comprise associating a predefined group of second users with the one or more types of metadata.

20. The computer program product of claim 15, wherein the sharing level includes a default sharing level, the default sharing level replicating a calendar sharing level associated with the calendar in which the first event is created.

* * * * *